United States Patent
Megarity

(10) Patent No.: US 9,047,421 B2
(45) Date of Patent: Jun. 2, 2015

(54) SERIAL LINK BUFFER FILL-LEVEL COMPENSATION USING MULTI-PURPOSE START OF PROTOCOL DATA UNIT TIMING CHARACTERS

(75) Inventor: Mark Megarity, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1745 days.

(21) Appl. No.: 12/112,917

(22) Filed: Apr. 30, 2008

(65) Prior Publication Data

US 2009/0276550 A1    Nov. 5, 2009

(51) Int. Cl.
G06F 3/00    (2006.01)
G06F 5/00    (2006.01)
G06F 13/42    (2006.01)

(52) U.S. Cl.
CPC .................................. G06F 13/4286 (2013.01)

(58) Field of Classification Search
None
See application file for complete search history.

(56) References Cited

U.S. PATENT DOCUMENTS

| | | | | | |
|---|---|---|---|---|---|
| 4,358,825 | A | * | 11/1982 | Kyu et al. | 710/106 |
| 5,768,530 | A | * | 6/1998 | Sandorfi | 709/233 |
| 5,889,779 | A | * | 3/1999 | Lincoln | 370/398 |
| 7,224,691 | B1 | * | 5/2007 | Yeluri et al. | 370/394 |
| 2002/0012340 | A1 | * | 1/2002 | Kalkunte et al. | 370/360 |
| 2002/0163935 | A1 | * | 11/2002 | Paatela et al. | 370/466 |
| 2003/0007498 | A1 | * | 1/2003 | Angle et al. | 370/414 |
| 2003/0058880 | A1 | * | 3/2003 | Sarkinen et al. | 370/413 |
| 2003/0105607 | A1 | * | 6/2003 | Jones et al. | 702/121 |
| 2003/0156542 | A1 | * | 8/2003 | Connor | 370/236 |
| 2004/0039874 | A1 | * | 2/2004 | Johnson | 711/105 |
| 2004/0215371 | A1 | * | 10/2004 | Samson et al. | 700/299 |
| 2004/0257995 | A1 | * | 12/2004 | Sandy et al. | 370/235 |
| 2005/0089042 | A1 | * | 4/2005 | Ruutu et al. | 370/395.21 |
| 2005/0190797 | A1 | * | 9/2005 | Elliot | 370/503 |
| 2005/0213693 | A1 | * | 9/2005 | Page | 375/354 |
| 2005/0216638 | A1 | * | 9/2005 | Smith et al. | 710/305 |
| 2005/0220025 | A1 | * | 10/2005 | Noguchi | 370/235 |
| 2005/0243825 | A1 | * | 11/2005 | Bitar et al. | 370/390 |
| 2006/0013138 | A1 | * | 1/2006 | Haran et al. | 370/236 |
| 2006/0056406 | A1 | * | 3/2006 | Bouchard et al. | 370/389 |
| 2007/0041319 | A1 | * | 2/2007 | Chilukoor et al. | 370/235 |
| 2007/0043964 | A1 | * | 2/2007 | Lim et al. | 713/322 |
| 2007/0130246 | A1 | * | 6/2007 | Lau et al. | 709/200 |
| 2007/0162665 | A1 | * | 7/2007 | Lee | 710/62 |
| 2007/0260782 | A1 | * | 11/2007 | Shaikli | 710/52 |
| 2007/0273699 | A1 | * | 11/2007 | Sasaki et al. | 345/502 |
| 2008/0109565 | A1 | * | 5/2008 | Ajanovic et al. | 710/8 |
| 2008/0137534 | A1 | * | 6/2008 | Chilukoor et al. | 370/232 |
| 2009/0006711 | A1 | * | 1/2009 | Biran et al. | 710/316 |
| 2009/0010252 | A1 | * | 1/2009 | Tsang et al. | 370/389 |
| 2009/0059958 | A1 | * | 3/2009 | Nakata | 370/474 |
| 2010/0031340 | A1 | * | 2/2010 | Batke et al. | 726/13 |

* cited by examiner

Primary Examiner — Henry Tsai
Assistant Examiner — Christopher Bartels
(74) Attorney, Agent, or Firm — Kramer & Amado, P.C.

(57) ABSTRACT

Embodiments of the invention provide improved timing compensation for a bidirectional serial link in order to relax accuracy requirements of clock sources used for the link. When forming a Protocol Data Unit (PDU) for transmission over the link, fill levels of receiver buffers at either ends of the link are used to determine a particular type of start of PDU (SOP) character sequence to use. When a given type of SOP character sequence is present in a PDU received at one end of the link, a next PDU to be transmitted from the same end of the link is delayed by a predetermined amount of time to allow the receiver buffer at the other end of the link to decrease its fill level before receiving the next PDU.

20 Claims, 2 Drawing Sheets

SERIAL LINK BUFFER FILL-LEVEL COMPENSATION USING MULTI-PURPOSE START OF PROTOCOL DATA UNIT TIMING CHARACTERS

FIELD OF THE INVENTION

The present invention is directed to data communication systems, in particular high speed data communication over a serial link.

BACKGROUND OF THE INVENTION

Data communications systems, and in general many other types of electronic systems, rely on a backplane based architecture comprising a plurality of circuit cards that plug into, or are otherwise electrically connected to, a system backplane. The system backplane is a facility over which the circuit cards can communicate with each other and over which power is supplied to the circuit cards. Examples of the type circuit cards included in data communications systems include control cards, input/output (I/O) cards, line cards, and processor cards.

A typical data communication system employs multiple serial links across the backplane for communications between the various circuit cards of the system. Generally, such communications occur over bidirectional serial links, each of which comprises a pair of unidirectional links each link of the pair being for data transmission in an opposite direction than the other link of the pair. A serial input/output (I/O) interface at each end of each bidirectional link comprises a transmitter and receiver. Typically both the transmitter and the receiver are implemented in one component known as a serializer/deserializer (SERDES). Generally, on any given unidirectional serial link, the transmitter at one end of the link is asynchronous to the receiver at the other end of that link. This is because transmitter and receiver each derive their timing from a respective reference clock, and those reference clocks are asynchronous to each other since they are typically generated locally at a respective circuit card.

A method exists to compensate for timing discrepancies in clocking of the transmitter and receiver at either end of a unidirectional serial link, but this method requires the use of clocks with known accuracies, which tends to make it costly to implement. Also, a requirement of the method is that the transmitter sends several special timing characters, known as idle or 'stuff' characters, every predetermined interval of time so that the receiver can compensate for its receive buffer fill rate. Since the interval between the transmission of the special timing characters is fixed, as well as the number of special characters that are inserted, the accuracy required by a reference clock used by the method is dictated by this interval and sequence length of the special timing characters. This aspect of the method hinders the use of inexpensive clocking sources in systems employing the method. Furthermore, in-band insertion of idle characters for the unique purpose of timing compensation at the receiver consumes link bandwidth as overhead, and is therefore inefficient.

In view of the foregoing, it would be desirable to have a solution that allows more design freedom in the selection of serial link reference clock sources than is available using the aforementioned known timing compensation method.

SUMMARY OF THE INVENTION

Embodiments of the invention provide improved timing compensation for a serial link in order to relax accuracy requirements of clock sources used for the link.

Some embodiments of the invention enable a transmitter at a near-end of a bidirectional serial link to forward a near-end fill level indication of a receiver buffer at the same end of the link to a receiver at a far-end of the link, which indication is used by a transmitter at the far-end of the link to adjust its data transmission rate.

Additionally, some embodiments of the invention also likewise provide, to the near-end transmitter, a far-end indication of a fill level of a receiver buffer at the far-end of the bidirectional link, thereby enabling the near-end transmitter to adjust its data transmission rate accordingly.

This communication of the near-end and far-end fill level indications represents real-time feedback that allows the bidirectional serial link to use less accurate clock sources than with aforementioned prior art timing compensation methods because the sequences of special timing characters at predetermined intervals are no longer needed.

According to an aspect of the invention there is provided a circuit card for communicating Protocol Data Units (PDUs) over a bidirectional serial link that includes a first unidirectional serial link for communicating PDUs in one direction and a second unidirectional serial link for communicating PDUs in an opposite direction. The circuit card comprises a transmitter module for transmitting PDUs over the first unidirectional serial link; a receiver module for receiving PDUs from the second unidirectional serial link; and a control link coupling the receiver module to the transmitter module for conveying control indications from the receiver module to the transmitter module.

According to another aspect of the invention there is provided a receiver module for receiving protocol data units PDUs from unidirectional serial link. The receiver module comprises an input for connecting to the unidirectional serial link; an output for coupling to a transmitter module; and a receiver buffer for storing PDUs received from the unidirectional serial link. The receiver module is operable to determine and send a particular control indication to the transmitter module, the determination depending upon a relationship between a fill level of the receiver buffer and a threshold.

According to yet another aspect of the invention there is provided a transmitter module for transmitting PDUs on a unidirectional serial link. The transmitter module comprises an output for connecting to the unidirectional serial link and an input for coupling to a receiver module. The transmitter module is operable to determine and use a particular start of PDU (SOP) character sequence to form a next PDU to be transmitted over the unidirectional serial link, the determination depending upon a particular control indication received from the receiver module.

According to still another aspect of the invention there is provided a transceiver module for transmitting and receiving PDUs over a bidirectional serial link that includes a first unidirectional serial link for communicating PDUs in one direction and a second unidirectional serial link for communicating PDUs in an opposite direction. The transceiver module comprises an output for connecting to the first unidirectional serial link; an input for connecting to the second unidirectional serial link; and a receiver buffer for storing PDUs received from the second unidirectional serial link. The transceiver module is operable to determine and use a particular SOP character sequence to form a next PDU to be transmitted over the first unidirectional serial link, the determination depending upon a relationship between a fill level of the receiver buffer and a threshold.

According to still another aspect of the invention there is provided a circuit card for transmitting and receiving PDUs over a bidirectional serial link that includes a first unidirectional serial link for communicating PDUs in one direction and a second unidirectional serial link for communicating PDUs in an opposite direction. The circuit card comprises an output for connecting to the first unidirectional serial link; an input for connecting to the second unidirectional serial link; and a receiver buffer for storing PDUs received from the second unidirectional serial link. The circuit card is operable to determine and use a particular SOP character sequence to form a next PDU to be transmitted over the first unidirectional serial link, the determination depending upon a relationship between a fill level of the receiver buffer and a threshold.

According to still another aspect of the invention there is provided a method of performing timing compensation on a bidirectional serial link that includes a first unidirectional serial link for communicating PDUs in one direction and a second unidirectional serial link for communicating PDUs in an opposite direction. The method comprises the steps of: receiving a first PDU from the second unidirectional serial link; storing the first PDU in a receiver buffer; detecting a fill level of the receiver buffer; comparing the fill level to a threshold; determining a particular SOP character sequence depending upon a relationship between the fill level and the threshold; forming a second PDU using the particular SOP character sequence; and transmitting the second PDU onto the first unidirectional serial link.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
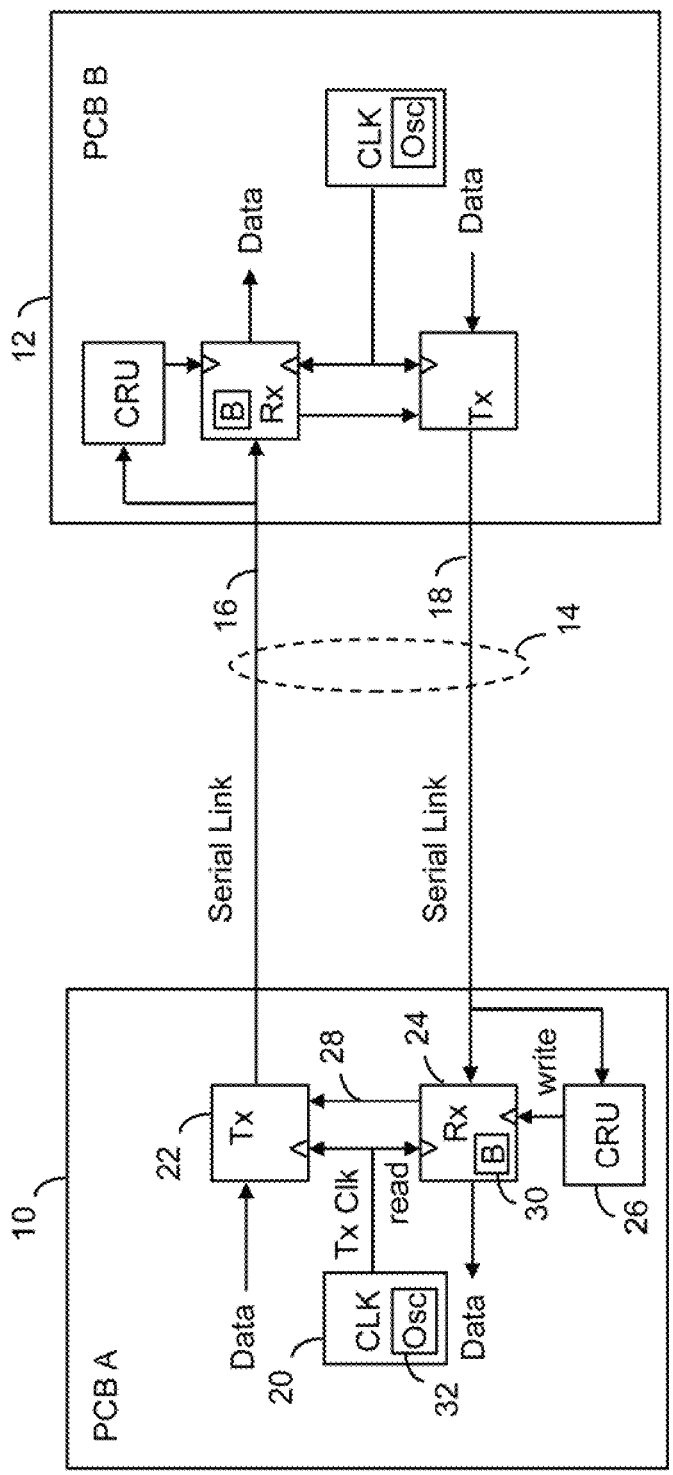
FIG. 1 is a high level block diagram of an embodiment of the present invention.

In a high-level block diagram, FIG. 1 depicts two circuit cards 10, 12, labeled respectively as printed circuit board (PCB) A and PCB B, that have been adapted to use improved timing compensation in accordance with an embodiment of the present invention. The two circuit cards 10, 12 communicate data in the form of PDUs over a bidirectional link 14 formed from two unidirectional serial links 16, 18. Data is transmitted from PCB A 10 to PCB B 12 over a first serial link 16 of the two serial links, and likewise data is transmitted from PCB B 12 to PCB A 10 over a second serial link 18 of the two serial links.

PCB A 10 includes a clock (CLK) module 20, a Transmitter (Tx) module 22, a receiver (Rx) module 24 and a clock recovery unit (CRU) 26. A control link 28 enables certain information as will be explained later to be conveyed from the receiver module 24 to the transmitter module 22. The clock recovery unit 26 recovers a clock signal from incoming data received over the second serial link 18 and provides a write clock to the receiver module 24 with which to write incoming data from the second serial link 18 into a receiver buffer (B) 30. The clock module 20 includes an oscillator (Osc) 32 that generates a signal frequency (F) falling within a given level of accuracy, e.g. 20 parts per million (ppm) or 50 ppm, from which the clock module 20 generates a transmit clock signal (Tx Clk). The transmit clock signal is used by the transmitter module 22 for timing of data sent on the first serial link 16 and is also used by the receiver module 24 for reading data from the receiver buffer 30.

PCB B 12 has the same functional elements with respect to the bidirectional link 14 as PCB A 10 and operates in the same manner regarding transmission and reception of data over the bidirectional link 14.

In order for each of the serial links 16, 18 to work properly, overflowing and underflowing the receiver buffer in the respective receiver module, e.g. receiver buffer 30 in receiver module 24, should be avoided. Overflows and underflows of the receiver buffers are possible because the clock modules of the respective circuit cards 10, 12 are not synchronized to each other. Therefore, the recovered clock signal from the clock recovery unit 26, which is recovered from incoming data received over the second serial link 18 and which is used to write data received from the same link into the receiver buffer 30, may have a slightly higher or slightly lower frequency than the transmit clock signal (Tx Clk) generated by the clock module 20, which is used for reading data from the receiver buffer 30. This difference in frequencies results in data being read from the receiver buffer 30 at a different rate than that at which new data is being written to the receiver buffer 30. Where the read data rate is higher than the write data rate an underflow condition will occur, and conversely when the read data rate is lower than the write data rate an overflow condition will occur. While it is desirable to avoid both conditions, an overflow condition is especially disadvantageous since it results in loss of data.

Since any typical serial link contains fixed PDUs of size 1 to n characters, a character being 8 bits in length, that periodically traverse the link, these datagrams consist of a special character sequence used solely to delineate the start of PDU (SOP). By extending and enhancing this special character sequence a multi-purpose function beyond its simple SOP definition can be achieved.

Figure 2:
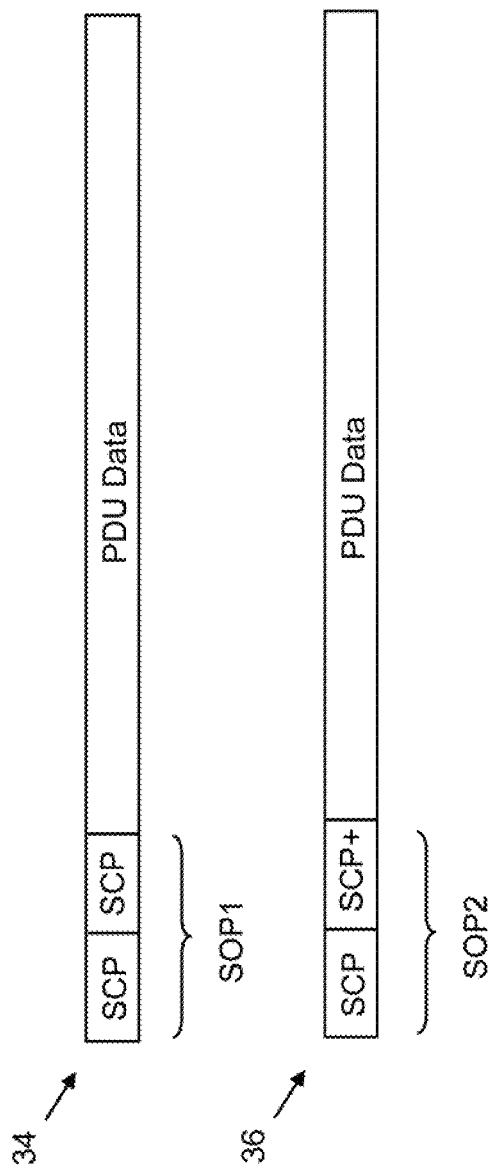
FIG. 2 depicts the multi-purpose start of PDU timing characters in accordance with an embodiment of the present invention.

Referring to FIG. 2, two different SOP character sequences SOP1, SOP2 are used by the circuit cards 10, 12 shown in FIG. 1 to implement improved timing compensation in accordance with an embodiment of the present invention. A first PDU 34 starts with a first SOP character sequence SOP1 and a second PDU 36 starts with a second SOP character sequence SOP2. The first SOP character sequence SOP1 denotes that a near-end receiver buffer has a fill level that is within an acceptable range, e.g. is at or below a threshold which could be equal to a midpoint capacity of the receiver buffer. The term near-end is used with respect to a point of reference being one of either of the circuit cards 10, 12. For example, if the circuit card PCB A 10 is taken as the point of reference, near-end receiver buffer would mean the receiver buffer 30 of the circuit card PCB A 10. The second SOP character sequence SOP2 denotes that the near-end receiver buffer has a fill level that is outside the acceptable range, e.g. is above the threshold for the receiver buffer. The first SOP character sequence SOP1 comprises a first type of PDU delineator character (SCP) followed by another delineator character of the same type. The second SOP character sequence SOP2 comprises the first type of PDU delineator character (SCP) followed by a second type of PDU delineator character (SCP+). It should e noted that only one of the SOP characters sequences SOP1, SOP2 is included in a PDU.

Taking the circuit card PCB A 10 as the near-end point of reference, operation of the improved timing compensation in accordance with an embodiment of the present invention will now be explained. The receiver module 24 detects the fill level of its receiver buffer 30. Depending on whether the fill level is above or below a predetermined threshold, one of two respective control indications will be sent by the receiver module 24 to the transmitter module 22 over the control link 28. For example, if the fill level is at or below the threshold a first control indication will be sent, otherwise a second control indication will be sent. The transmitter module 22 receives the control indication and from that determines which SOP character sequence to append to the PDU data of the next PDU to be sent over the first serial link 16. If the transmitter module 22 receives the first control indication then it appends the first SOP character sequence SOP1 to the PDU data to form the next PDU that it will send. If the second control indication is received by the transmitter module 22 it will append the second SOP character sequence SOP2 to the PDU data to form the next PDU that it will send. The receiver module at the far-end circuit card PCB B 12 detects which of the two SOP character sequence was received with a given PDU and instructs the far-end transmitter module to adjust its transmission of data over the second serial link 18 accordingly. This adjustment will be explained below in reference to the circuit card PCB A 10.

Still taking the circuit card PCB A 10 as the near-end point of reference, when the receiver module 24 receives a PDU from the second serial link 18 it detects which of the two SOP character sequences was received with that PDU. If the first SOP character sequence SOP1 was received this denotes that the fill level of the far-end receiver buffer is within an acceptable range and no adjustment needs to be made to the transmission of data over the first serial link 16 by near-end transmitter module 22. However, if the second SOP character sequence SOP2 was received this denotes that the fill level of the far-end receiver buffer is outside an acceptable range and an adjustment is needed to the transmission of data over the first serial link 16 by the near-end transmitter module 22. In this case a third control indication is sent by the receiver module 24 to the transmitter module 22 over the control link 28. When the transmitter module 22 receives the third control indication delays the transmission of the next PDU by one character time, which is the duration of time required to transmit one character at the data rate of the first serial link 16. In this manner the far-end receiver module is given time to read one character from its receiver buffer before another character is written to the buffer, thereby reducing its buffer fill level. If necessary, the second SOP character sequence SOP2 can be included in multiple consecutive PDUs which will eventually bring the fill level of the far-end receiver buffer to within its acceptable range.

The use of the SOP character sequences, which are special character sequences, to uniquely define the start of a PDU as well as receiver buffer fill level at a near-end of a serial link enables a receiver module at the far-end of the serial link to uniquely identify these special character sequences as control information rather than simply data. This identification is made immediately upon reception of a given PDU rather than after forwarding to, and storing in, a buffering point as in the case of data characters. This immediate identification enables timely action to be taken at the far-end transmitter module to rectify any adverse fill level condition in the receiver buffer at the near-end of the serial link.

In the absence of PDU data to send on one of the serial links 16, 18 the respective transmitter module would periodically insert a unique PDU consisting of only an appropriate one of the SOP character sequences SOP1, SOP2 to signal the current status of the fill level of the near-end receiver buffer to the far-end receiver module. This enables far-end transmitter module to adjust its transmission of data to accommodate the fill level of the near-end receiver buffer even when there is no PDU data to be sent by the near-end transmitter module.

Numerous modifications and variations may be made to the embodiment of the invention described above without departing from the scope of the invention, which is defined in the claims. For example, a modification would be to use multiple receiver buffer thresholds to define a plurality of ranges of buffer fill levels, each of which range corresponding to a respective SOP character sequence that each in turn would cause a transmitter module to adjust its PDU transmission in a respective manner. For example, a second threshold could be defined corresponding to a 75% fill level of a receiver buffer and a corresponding third SOP character sequence SOP3 could be defined that causes a transmitter module to delay transmission of the next PDU by two character times. A variation would be to use only one character for each SOP character sequence. For example the first SOP character sequence SOP1 could comprise only the first type of PDU delineator character SCP, while the second SOP character sequence SOP2 could comprise only the second type of PDU delineator character SCP+. Another modification would be to eliminate the use of the first control indication and have the transmitter modules start each PDU with the first SOP character sequence SOP1 by default unless the second control indication is received, in which case the second SOP character sequence SOP2 would be appended to the next PDU data to be sent. Still another modification would be to combine the transmitter module 22 and receiver module 24 to form a single transceiver module having all the capabilities of the individual modules 22, 24 yet without the need for the control link 28 coupling the individual modules 22, 24.

It should now be apparent that the described embodiment, modifications, variations and adaptations of improved timing compensation on a bidirectional serial link provide advantages over existing timing compensation on such links. Specifically, the improved timing compensation more efficiently uses SOP characters by combining PDU delineation and buffer fill level information into those characters, which results in more efficient use of link bandwidth. Further to this point, the improvement alleviates the need for in-band insertion of timing compensation characters such as idle characters at fixed time intervals, thereby allowing more bandwidth for bearer data. Additionally, by eliminating in-band insertion of idle characters at fixed time intervals, design constraints on clock source accuracy are relaxed providing more design freedom, which advantageously offers the possibility of using inexpensive clock sources.

What is claimed is:

1. A first circuit card for communicating protocol data units (PDUs) over a bidirectional serial link that includes a first unidirectional serial link for communicating PDUs from the first circuit card to a second circuit card and a second unidirectional serial link for communicating PDUs from the second circuit card to the first circuit card, the first circuit card comprising:
a transmitter module for transmitting PDUs over the first unidirectional serial link at a first rate for at least one read transaction;
a receiver module for receiving PDUs from the second unidirectional serial link at a second rate for at least one write transaction and for detecting a fill level of a receiver buffer;
and a control link coupling the receiver module to the transmitter module for conveying control indications from the receiver module to the transmitter module, wherein said control indications comprises a first Start of PDU (SOP) character sequence and a second Start of PDU (SOP) character sequence;

wherein the first Start of PDU (SOP) character sequence is sent if the fill level of the receiver buffer is at or below a threshold and the second SOP character sequence, different from the first SOP character sequence, is sent if the fill level of the receiver buffer is above the threshold.

2. The first circuit card of claim 1, wherein the transmitter module is operable to determine and use a particular SOP character sequence to form a next PDU to be transmitted over the first unidirectional serial link, based upon a particular control indication received from the receiver module.

3. The first circuit card of claim 2, wherein the transmitter module is further operable to use the first SOP character sequence as the particular SOP character sequence responsive to the fill level of the receiver buffer being at or below a threshold.

4. The first circuit card of claim 3, wherein the transmitter module is further operable to use the second SOP character sequence as the particular SOP character sequence responsive to the fill level of the receiver buffer being above the threshold.

5. The first circuit card of claim 1, wherein the receiver module is operable to determine and send a particular control indication to the transmitter module responsive to receiving a first PDU from the second unidirectional serial link, based upon the SOP character sequence of the first PDU.

6. The first circuit card of claim 5, wherein the receiver module is further operable to send the particular control indication to the transmitter module responsive to the first PDU starting with a particular SOP character sequence; and the transmitter module is operable to delay transmission of a next PDU by a predetermined amount of time responsive to receiving the particular control indication from the receiver module.

7. The first circuit card of claim 6, wherein the predetermined amount of time is an amount of time taken to transmit one character on the first unidirectional serial link.

8. The first circuit card of claim 2, wherein the determination of the receiver module is dependent upon the SOP character sequence of a first PDU received from the second unidirectional serial link; and the transmitter module is further operable to delay transmission of the next PDU by a predetermined amount of time depending upon the particular control indication received from the receiver module.

9. The first circuit card of claim 8, wherein the predetermined amount of time is an amount of time taken to transmit one character on the first unidirectional serial link.

10. A receiver module for receiving protocol data units (PDUs) from a unidirectional serial link, comprising:
an input for connecting to the unidirectional serial link at a first rate for at least one write transaction;
an output for coupling to a transmitter module at a second rate for at least one read transaction;
and a receiver buffer for storing PDUs received from the unidirectional serial link, wherein the receiver module is operable to determine and sends a plurality of control indications to the transmitter module,
wherein said plurality of control indications comprises a first Start of PDU (SOP) character sequence and a second Start of PDU (SOP) character sequence, each control indication based upon a relationship between a fill level of the receiver buffer and a threshold;
wherein the first start of PDU (SOP) character sequence is sent if the fill level of the receiver buffer is at or below the threshold and the second SOP character sequence, different from the first SOP character sequence, is sent if the fill level of the receiver buffer is above the threshold.

11. The receiver module of claim 10, wherein the receiver module is further operable to determine and send a control indication to the transmitter module responsive to receiving a PDU from the unidirectional serial link, based upon the SOP character sequence of the PDU.

12. A transmitter module for transmitting protocol data units (PDUs) on a unidirectional serial link, comprising:
an output for connecting to the unidirectional serial link at a first rate for at least one read transaction; and
an input for coupling to a receiver module at a second rate for at least one write transaction, wherein the transmitter module is operable to determine and use a particular start of PDU (SOP) character sequence to form a next PDU to be transmitted over the unidirectional serial link, based upon a particular control indication received from the receiver module, wherein a first SOP character sequence is sent if the fill level of a receiver buffer is at or below a threshold and a second SOP character sequence, different from the first SOP character sequence, is sent if the fill level of the receiver buffer is above the threshold.

13. The transmitter module of claim 12, wherein the transmitter module is further operable to delay transmission of the next PDU by a predetermined amount of time responsive to receiving a control indication from the receiver module.

14. A transceiver module for transmitting and receiving protocol data units (PDUs) over a bidirectional serial link that includes a first unidirectional serial link for communicating PDUs from a first circuit card to a second circuit card and a second unidirectional serial link for communicating PDUs from the second circuit card to the first circuit card, the transceiver module comprising:
an output for connecting to the first unidirectional serial link at a first rate for at least one read transaction;
an input for connecting to the second unidirectional serial link at a second rate for at least one write transaction; and
a receiver buffer for storing PDUs received from the second unidirectional serial link, wherein the transceiver module is operable to determine and use a particular start of PDU (SOP) character sequence to form a next PDU to be transmitted over the first unidirectional serial link, based upon a relationship between a fill level of the receiver buffer and a threshold, wherein a first SOP character sequence is sent if the fill level of the receiver buffer is at or below the threshold and a second SOP character sequence, different from the first SOP character sequence, is sent if the fill level of the receiver buffer is above the threshold.

15. The transceiver module of claim 14, wherein the transceiver module is further operable to delay transmission of the next PDU by a predetermined amount of time responsive to receiving a PDU from the second unidirectional serial link, based upon the SOP character sequence of the PDU received from the second unidirectional serial link.

16. A first circuit card for transmitting and receiving protocol data units (PDUs) over a bidirectional serial link that includes a first unidirectional serial link for communicating PDUs from the first circuit card to a second circuit card and a second unidirectional serial link for communicating PDUs from the second circuit card to the first circuit card, the first circuit card comprising:
an output for connecting to the first unidirectional serial link at a first rate for at least one read transaction;
an input for connecting to the second unidirectional serial link at a second rate for at least one write transaction; and
a receiver buffer for storing PDUs received from the second unidirectional serial link, wherein the first circuit card is operable to determine and use a particular start of PDU (SOP) character sequence to form a next PDU to be transmitted over the first unidirectional serial link, based upon a relationship between a fill level of the receiver buffer and a threshold, wherein a first SOP character sequence is sent if the fill level of the receiver buffer is at or below a threshold and a second SOP character sequence, different from the first SOP character sequence, is sent if the fill level of the receiver buffer is above the threshold.

17. The first circuit card of claim 16, wherein the first circuit card is further operable to delay transmission of the next PDU by a predetermined amount of time responsive to receiving a PDU from the second unidirectional serial link, based upon the SOP character sequence of the PDU received from the second unidirectional serial link.

18. A method of performing timing compensation on a bidirectional serial link that includes a first unidirectional serial link for communicating protocol data units (PDUs) from a first circuit card to a second circuit card at a first rate for at least one read transaction and a second unidirectional serial link for communicating PDUs from the second circuit card to the first circuit card at a second rate for at least one write transaction, the method comprising:

receiving a first PDU from the second unidirectional serial link;

storing the first PDU in a receiver buffer;

detecting a fill level of the receiver buffer;

comparing the fill level to a threshold;

determining a particular start of PDU (SOP) character sequence depending upon a relationship between the fill level and the threshold;

forming a second PDU using the particular SOP character sequence; and transmitting the second PDU onto the first unidirectional serial link, wherein a first SOP character sequence is sent if the fill level of the receiver buffer is at or below a threshold and a second SOP character sequence, different from the first SOP character sequence, is sent if the fill level of the receiver buffer is above the threshold.

19. The method of claim 18, wherein the step of receiving comprises:

detecting an SOP character sequence of the first PDU and determining a type of the SOP character sequence; and the step of transmitting comprises:

delaying transmission of the second PDU by a predetermined amount of time responsive to determining that the SOP character sequence is of a given type.

20. The method of claim 19, wherein the predetermined amount of time is an amount of time taken to transmit one character on the first unidirectional serial link.

* * * * *